Patented July 4, 1939

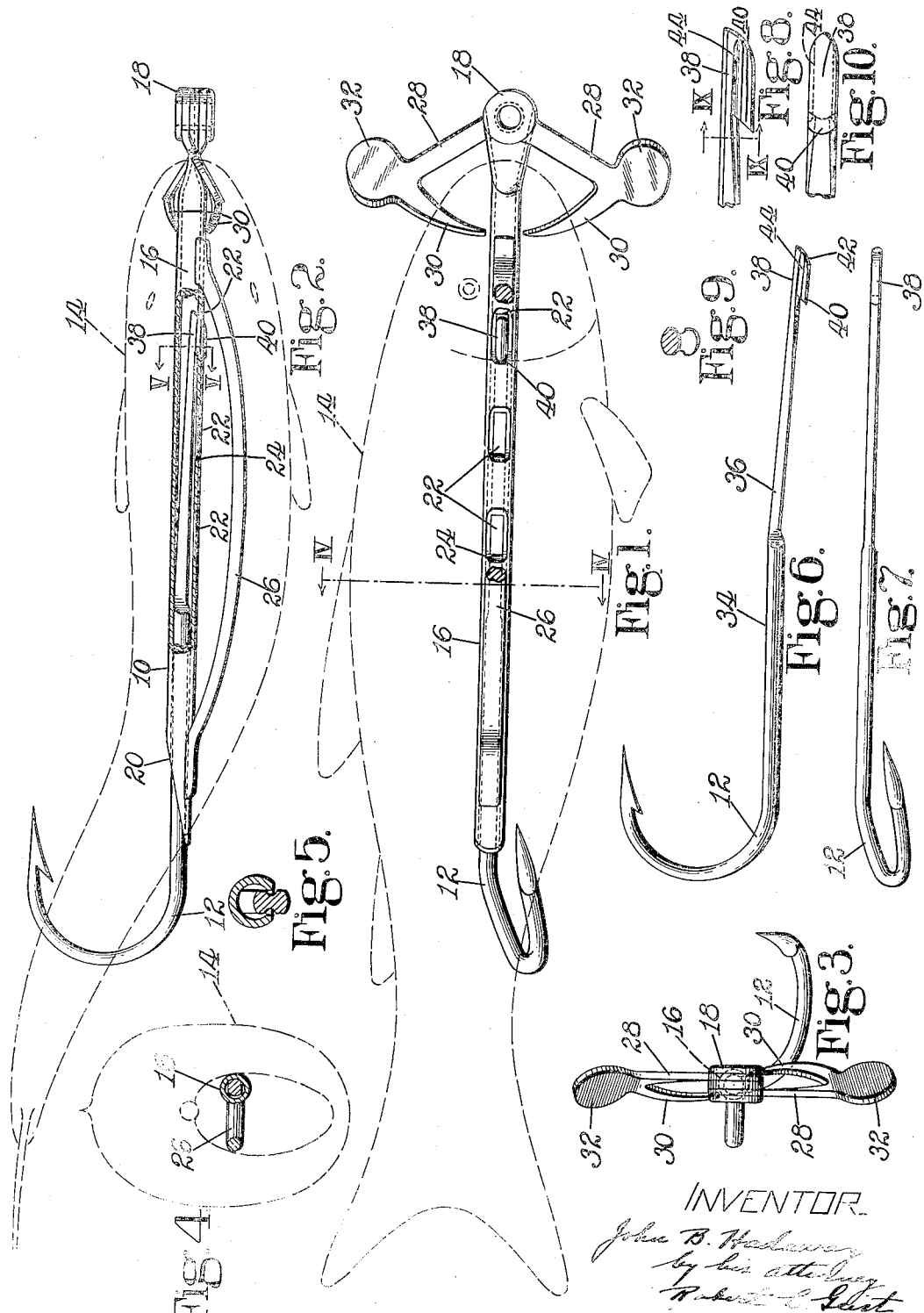

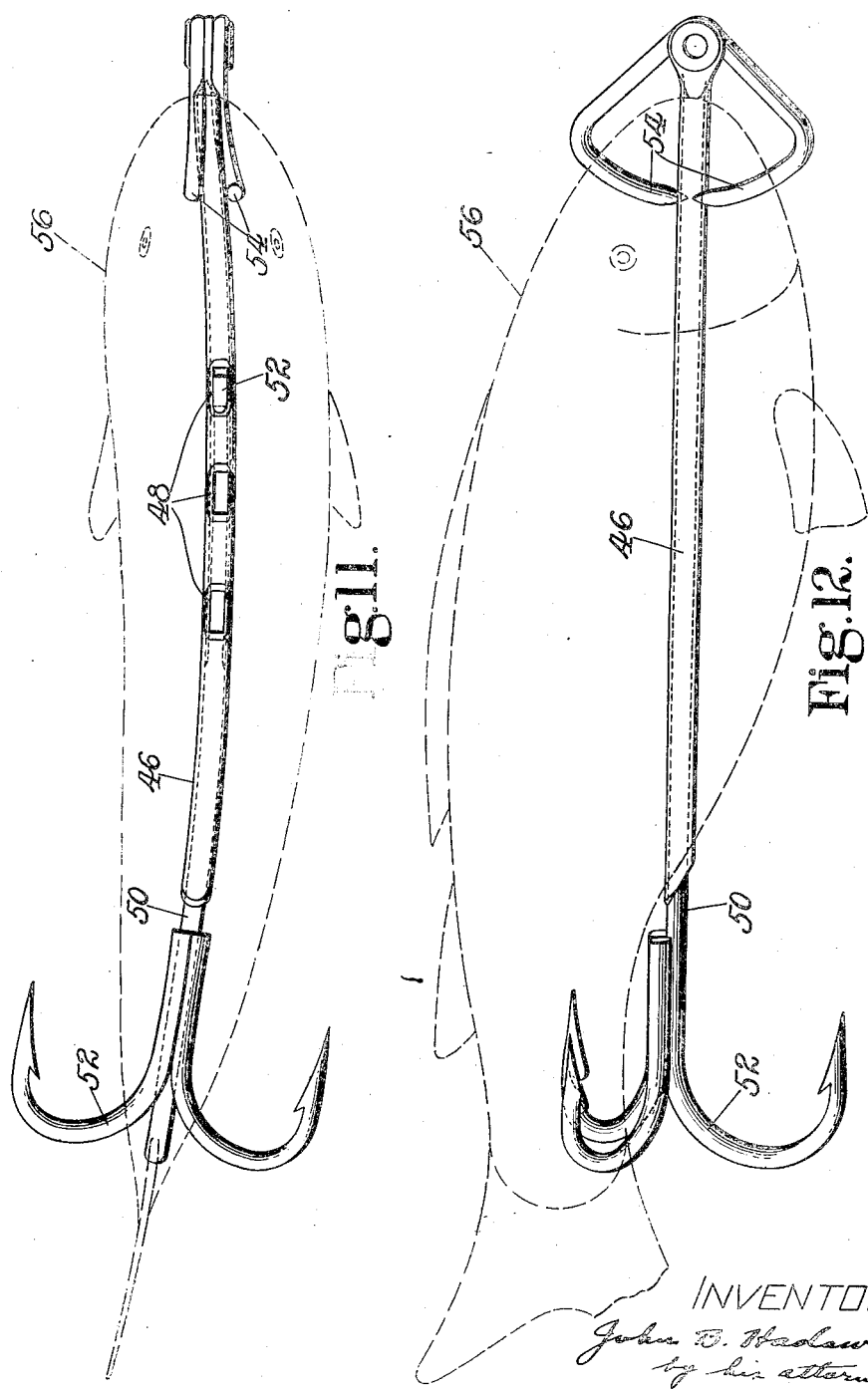

2,164,708

UNITED STATES PATENT OFFICE 2,164,708

BAIT HOLDER

John B. Hadaway, Swampscott, Mass.

Application July 20, 1936, Serial No. 91,525

17 Claims. (Cl. 43—40)

This invention relates to fishing tackle and is herein illustrated as embodied in a bait holder of the type adapted to hold a minnow or similar lure.

An object of the present invention is to provide an improved bait holder which will be simple in construction and which will be readily detachable from the hook or hooks with which it is used as well as to hide as much as possible of the device within the lure itself so as to detract as little as possible from the natural appearance of the lure.

To this end and as shown, I have provided a bait holder which comprises an impaling needle and a hook having a shank provided with means cooperating with means upon the needle for detachably securing the needle and hook together. Preferably and as shown the impaling needle is tubular and is provided with a series of recesses or slots extending along its body portion, the hook being provided with a shank terminating in a head which is arranged to engage selectively with one or another of the recesses when the shank is forced into the needle so that the hook will be held in predetermined position relatively to the impaling needle. This construction is advantageous in that any one of a plurality of different types of hooks or clusters of hooks can readily be utilized with a bait-impaling needle and the hook adjusted to the length of the minnow or lure which is impaled upon the needle. The headed shank of the hook is readily releasable from the impaling needle when desired for the purpose of changing the lure or hook and is securely held in position when required.

Preferably and as shown, the impaling needle is curved or has a curved portion which holds the minnow or lure in curved position so that entirely irrespective of spinners or other attachments which might be used with the tackle the minnow or lure is caused to rotate about the axis of the line to which it is attached, thus causing the lure to turn and wobble in such manner as to imitate a wounded minnow or one disporting itself as they often do in their natural haunts which causes their sides and bellies to reflect light which acts to attract from a distance fish which habitually pursue smaller fish for food.

Preferably too, and as shown, the impaling needle is provided with prongs adapted to enter portions of the body of the minnow or lure to hold the same in position thereon. Moreover, the end of the shank of the hook is bent laterally of the axis of the main body portion of the shank so that when the hook is inserted in the needle the head thereof will snap into position in one of the recesses. Furthermore, the side portions of the head are provided with grooves which engage portions of the walls of the recesses, thus to prevent rotation of the shank relatively to the needle.

These and other features of the invention I have illustrated in the accompanying drawings, described in the following detailed specification, and pointed out in the claims.

In the drawings,

Fig. 1 is a plan view of a bait holder embodying a preferred form of my invention;

Fig. 2 is a side view of the bait holder shown in Fig. 1;

Fig. 3 is an end view of the bait holder;

Fig. 4 is a cross-sectional view of the bait holder taken along line IV—IV of Fig. 1;

Fig. 5 is a cross-sectional view taken along line V—V of Fig. 2;

Fig. 6 is a side view of the preferred form of hook;

Fig. 7 is a plan view of the hook;

Fig. 8 is a side view of the head of the hook;

Fig. 9 is a cross-sectional view taken along line IX—IX of Fig. 8;

Fig. 10 is a plan view of the head of the hook;

Fig. 11 is a plan view of a modified form of bait holder constructed in accordance with my invention; and Fig. 12 is a side view of the bait holder shown in Fig. 11.

The preferred form of my invention is illustrated in Figs. 1 and 2 which disclose an impaling needle 10, and an associated hook 12 shown in position relatively to a lure in the form of a minnow indicated by outlines 14. The impaling needle 10 comprises a hollow tube 16, at one end of which is secured a grommet 18 and the other end of which is beveled as shown at 20 to form a piercing point. Longitudinally of the needle there are a plurality of recesses 22 formed by removing material from the outer walls of the needle, the walls of these recesses being wedge shaped as shown at 24. Extending from points beyond the series of recesses is a curved bar 26 welded or otherwise secured to the outer wall of the needle. The purpose of this bar is to cause a curvature in the position of a minnow or lure as shown in Fig. 2 when the needle is inserted lengthwise of the minnow or lure. By causing the lure to assume a curved position when the bait holder is drawn through the water the lure will wobble or rotate about an axis positioned inwardly of the convex portion of the curved bar, thus to effect a variation in the appearance of the lure which will result in attracting fish thereto. It is to be noted that the pointed end 20 of the needle facilitates the insertion of the bait holder in the lure and that portions thereof which may enter the bore of the needle will not be very large because of the sharp bevel and will not interfere with the operation of the device by reason of the fact that they will pass out through the recesses 22.

In order to secure the lure in predetermined position relatively to the needle 10, the latter at its right-hand end, in Figs. 1 and 2, is provided with a pair of arms 28 rotatably mounted upon the grommet 18 and having prongs 30 which are adapted to move inwardly toward the needle to penetrate the lure at the head portion thereof and to hold the same with the mouth closed in fixed position longitudinally of the needle. Preferably too, the arms 28 carry flattened vanes 32 which constitute spinners operable when the bait holder is drawn through the water to cause rotation thereof in the manner customary with devices of this kind.

Cooperating with the needle as above mentioned is the hook 12 which, as shown in Figs. 6 and 7, is provided with a spring shank 34 slightly less than the interior diameter of the needle 10 and having an end portion 36 which is somewhat reduced in cross-section and is bent at an angle to the main body portion of the shank. The end portion 36 terminates in an abutment or head 38 having upon the underside thereof a barb 40. This arrangement is such that when the shank is forced into the needle 10 the head 38 when rotated in proper position will be snapped into one or another of the recesses 22 with the barb 40 extending rearwardly and in position to engage the outer side of the wedge-shaped walls of the recess, thus to hold the hook in predetermined position in the needle. The end portion 36 is sufficiently springy so that upon forcing the hook inwardly contact of a grooved portion 42 of the head with the forward wall of the recess will cause the end portion 36 to bend toward the axis of the needle and permit the head to pass to the next recess. The reduced portion 36 of the shank is sufficiently springy so that it can be readily bent by fingers or pliers to control the pressure of the head 38 upon the walls of the needle.

In order to prevent likelihood of the head being withdrawn from its position in that bait recess the side walls of the head are provided with longitudinally extending grooves 44 arranged when the head is positioned within a recess and rotatable slightly therein to engage the wedge-shaped portions 24 of the walls of the recess, thereby preventing rotation of the hook. When it is desired to remove the hook from the needle as is required to substitute another hook or to change the bait on the needle, the hook can be pushed inwardly until the head 38 is forced downwardly toward the axis of the tool after which the hook is rotated slightly and it can then be withdrawn by an outward motion without having the barb 40 engage any obstruction.

In the modified form of my invention illustrated in Figs. 11 and 12, I have shown a hollow impaling needle 46, somewhat curved in shape, provided with a series of recesses 48 similar to those illustrated in Figs. 2 and 3 and having positioned therein a shank 50 which terminates in a head 52 adapted to engage the walls of one or another of the recesses. As shown the shank carries at its outer end a cluster of hooks 52.

The needle 46 is provided with rotatable prongs 54 to retain thereon the lure, shown in dotted lines 56. This construction is somewhat simpler than that previously described but can be operated with similar results, that is, the curvature of the impaling needle holds a minnow or lure in curved position thus to cause the minnow or lure to wobble as the bait holder is drawn through the water.

It is believed that the operation of my invention will be apparent from the above description. However, in summary, it is to be noted that in the use of the preferred form of my device, the impaling needle 10 is thrust through the central portion of the minnow or lure through the mouth and toward the rear portion thereof, the curved bar 26 causing the lure to assume a curved position. After the lure is in position upon the bait holder, the prongs 30 are swung inwardly about the grommet 18 to penetrate the head of the lure, thereby holding it in fixed position on the needle. A hook such as the hook 12 is then thrust through the open end of the needle until the head 38 engages with one or the other of the recesses 22, the recess being engaged being dependent upon the length of the lure, that is, the hook is normally brought as close to the body of the needle as possible, progressively using the successive recesses until this is accomplished. When it is desired to remove the hook, it is merely necessary to position it still further into the needle until the head is disengaged from the recess, to rotate the hook slightly, and then to pull it out from the needle.

Having described my invention, what I claim as new and desire to secure by Letters Patent of the United States is:

1. A bait holder having a curved tubular impaling needle, a hook having a curved shank, and means carried by the needle and hook for detachably securing the shank within the needle.

2. A bait holder comprising a tubular impaling needle having a recess in its body portion, a side wall of which is in the form of a wedge-shaped abutment, and a hook having a shank provided with a complementary abutment adapted to engage the first-mentioned abutment when the shank of the hook is inserted in the impaling needle.

3. A bait holder provided with a tubular needle having a recess formed in the body portion thereof for the reception of the shank end of a hook, and a groove in the shank of the hook, the material of the needle being reduced adjacent the recess and being constructed and arranged to enter the groove for locking the shank within the needle.

4. A bait holder comprising an impaling tube having at one end spinner members terminating in prongs adapted to engage and hold the bait upon the holder and for turning the holder when the latter is drawn through water, and a hook having a shank adapted to be secured within the tube.

5. A bait holder comprising a tubular impaling needle, a hook adapted to be detachably secured in position within the impaling needle, and means independent of the hook for holding the bait upon the needle.

6. A bait holder comprising a tubular impaling needle, a curved bar secured to the needle lengthwise thereof for supporting a minnow in curved position, and a prong for retaining the minnow in fixed position upon the impaling needle.

7. A bait holder comprising a tubular impaling needle having recesses formed in its body portion, and a hook having a shank the end of which has a projection for engaging one of said recesses, the end of the shank being bent out of line with the axis of the main body portion of the shank, thereby to force the end of the shank into said recess when the shank is forced into the needle to lock the hook in fixed position relatively to the needle.

8. A bait holder comprising a tubular impaling needle, having a recess in the body portion thereof, a hook having a shank terminating in an abutment of less width than the inside diameter of the needle and bent laterally of the axis of the shank, whereby the abutment is adapted to enter the recess in the needle when the shank is forced into the needle thereby to lock the hook therein.

9. A fish hook having a shank terminating in a barb at each end, and a tubular impaling needle having means for engaging one of the barbs to retain the hook in position in the needle.

10. A fish hook comprising a shank having at one end a barbed hook, a portion of the shank at the other end being reduced in thickness and extending at an inclination to the axis of the main portion of the shank and terminating in a barbed head.

11. A fish hook comprising a shank one end of which terminates in a hook, the other end of which is inclined relatively to the axis of the main body portion of the shank and terminates in a barbed head having grooves in the sides thereof.

12. A bait holder comprising a tubular impaling needle, a fish hook having a shank positioned within the needle and having a retaining head for engagement with a recess in the needle, the shank being reduced in size in back of the head to permit of its being sprung out of a straight line.

13. A bait holder comprising a tubular impaling member having a recess formed in its body portion, and a hook member having a shank on the end of which is formed a projection for engaging the recess, one of the members being straight and the other bent to cause the projection on the shank of the hook member to enter the recess and to be locked to the impaling member when the shank of the hook member is forced into the impaling member.

14. A bait holder comprising a tubular impaling needle having a recess formed in its body portion, and a hook comprising a shank on the end of which is formed a projection for entering the recess in the body portion of the needle when the projection is forced into the needle thereby to secure the hook to the needle.

15. A bait holder comprising a tubular impaling member having a recess formed in its body portion, and a hook member having a shank on the end of which is formed a projection for entering the recess to engage and lock the hook to the needle, one of the members being straight and the other bent.

16. A bait holder having a tubular impaling needle one end of which is beveled to form a cutting edge at the end of the needle to penetrate a bait forced upon the needle.

17. A bait holder comprising a tubular impaling needle having a recess formed in its body portion, and a hook having a shank on the end of which is formed a projection to engage the needle within the recess, the projection being flattened on two sides and having a longitudinal groove in each side and a beveled portion in the inner end to lock the projection within the recess against a forward pull or a lateral twist while the hook is locked within the impaling needle.

JOHN B. HADAWAY.